US010850784B1

(12) United States Patent
Hamilton

(10) Patent No.: US 10,850,784 B1
(45) Date of Patent: Dec. 1, 2020

(54) MULTI-ADJUSTMENT BICYCLE RACK FOR STORAGE AREA

(71) Applicant: David A. Hamilton, Littleton, CO (US)

(72) Inventor: David A. Hamilton, Littleton, CO (US)

(73) Assignee: David A. Hamilton, Littleton, CO (US)

( * ) Notice: Subject to any disclaimer, the term of this patent is extended or adjusted under 35 U.S.C. 154(b) by 0 days.

(21) Appl. No.: 16/728,864

(22) Filed: Dec. 27, 2019

(51) Int. Cl.
*B62H 3/08* (2006.01)
*B63H 3/00* (2006.01)

(52) U.S. Cl.
CPC ........ *B62H 3/08* (2013.01); *B63H 3/00* (2013.01)

(58) Field of Classification Search
CPC ... B62H 3/00; B62H 3/04; B62H 3/06; B62H 3/08; B62H 2003/005; A47F 7/04
USPC .................................................. 211/17–24
See application file for complete search history.

(56) References Cited

U.S. PATENT DOCUMENTS

| | | | | |
|---|---|---|---|---|
| 518,325 A * | 4/1894 | Mueller | ........... | B62H 3/04 211/22 |
| 529,939 A * | 11/1894 | Noderer | ........... | B62H 3/08 211/20 |
| 556,806 A * | 3/1896 | Chandler | ........... | B62H 3/08 211/20 |
| 593,728 A * | 11/1897 | Pruden | ........... | B62H 3/12 211/19 |
| 803,196 A * | 10/1905 | Shearman | ........... | B62H 3/08 211/20 |
| 3,547,258 A * | 12/1970 | Black | ........... | A47B 45/00 206/304 |
| 3,603,459 A * | 9/1971 | Erb | ........... | B62H 3/08 211/20 |
| 3,785,517 A * | 1/1974 | Brajkovich | ........... | B60R 9/10 414/462 |
| 4,050,583 A * | 9/1977 | Szabo | ........... | B62H 3/08 211/20 |
| 4,352,432 A | 10/1982 | Smith | | |
| 4,465,196 A | 8/1984 | Erb | | |
| 4,941,651 A * | 7/1990 | Phillips | ........... | A63B 69/16 434/61 |
| 5,152,729 A * | 10/1992 | Phillips | ........... | A63B 69/16 434/61 |

(Continued)

FOREIGN PATENT DOCUMENTS

| | | | |
|---|---|---|---|
| CN | 206107404 U | | 4/2017 |
| KR | 483119 | * | 4/2017 |

(Continued)

OTHER PUBLICATIONS

The Home Depot, "Fat Swivel 1—Bike Vertical Bike Rack", https://www.homedepot.com/p/Steadyrack-Fat-Swivel-1-Bike-Vertical-Bike-Rack-B-SRFT-001/302644101?, (Accessed Oct. 31, 2019), 3 pages.

*Primary Examiner* — Jonathan Liu
*Assistant Examiner* — Devin K Barnett
(74) *Attorney, Agent, or Firm* — Dorsey & Whitney LLP

(57) ABSTRACT

Disclosed herein is a bicycle rack for organizing a storage area and associated systems and methods of use thereof. The bicycle rack can be adapted to receive and hold bicycles having various diverse characteristics, and store the bicycles in a space-efficient manner. The bicycle rack can have a tire receiving zone for receiving and holding a tire of a bicycle for storage. The tire receiving zone can have an adjustable zone width, an adjustable zone depth, and an adjustable zone orientation.

20 Claims, 13 Drawing Sheets

(56) References Cited

U.S. PATENT DOCUMENTS

| | | | | |
|---|---|---|---|---|
| 5,417,629 | A * | 5/1995 | Phipps | B62H 1/04 211/22 |
| 5,833,074 | A | 11/1998 | Phillips | |
| 5,988,402 | A * | 11/1999 | Mayfield | B62H 3/04 211/20 |
| 6,640,979 | B1 * | 11/2003 | Mayfield | B62H 3/00 211/20 |
| 7,810,685 | B2 * | 10/2010 | Bove | B60R 9/10 224/324 |
| 7,958,973 | B2 * | 6/2011 | Swasand | B60T 3/00 188/32 |
| 8,104,588 | B2 * | 1/2012 | Curlee | B62H 3/08 188/32 |
| 9,254,790 | B2 * | 2/2016 | Dreger | B60R 9/06 |
| 9,610,993 | B1 * | 4/2017 | Ho | B62H 3/06 |
| 9,650,092 | B1 * | 5/2017 | Tsai | B62H 3/06 |
| 10,618,582 | B1 * | 4/2020 | Liu | B62H 3/04 |
| 2002/0117459 | A1 * | 8/2002 | Chen | B66F 3/005 211/20 |
| 2005/0284036 | A1 | 12/2005 | Blume | |
| 2007/0017882 | A1 * | 1/2007 | Lewis | B62H 3/08 211/20 |
| 2007/0023367 | A1 * | 2/2007 | Chung | B60R 9/10 211/20 |
| 2007/0138112 | A1 * | 6/2007 | Meyer | B60B 29/00 211/24 |
| 2009/0001031 | A1 * | 1/2009 | Hutchinson, II | B62H 3/04 211/21 |
| 2011/0233154 | A1 * | 9/2011 | St. Louis | B62H 3/08 211/13.1 |
| 2014/0183147 | A1 * | 7/2014 | Chiu | A47F 7/04 211/17 |
| 2016/0101313 | A1 * | 4/2016 | Hsu | A63B 21/0088 482/61 |
| 2016/0144912 | A1 * | 5/2016 | Greenblatt | B62H 3/06 211/5 |
| 2017/0240231 | A1 * | 8/2017 | Robinson | B62H 3/08 |
| 2018/0265014 | A1 * | 9/2018 | Phillips | B62H 3/12 |
| 2020/0198721 | A1 * | 6/2020 | Ho | B62K 15/008 |

FOREIGN PATENT DOCUMENTS

| | | |
|---|---|---|
| NL | 1026406 C2 | 7/2005 |
| TW | M551588 U | 11/2017 |
| WO | 2017198918 A1 | 11/2017 |

* cited by examiner

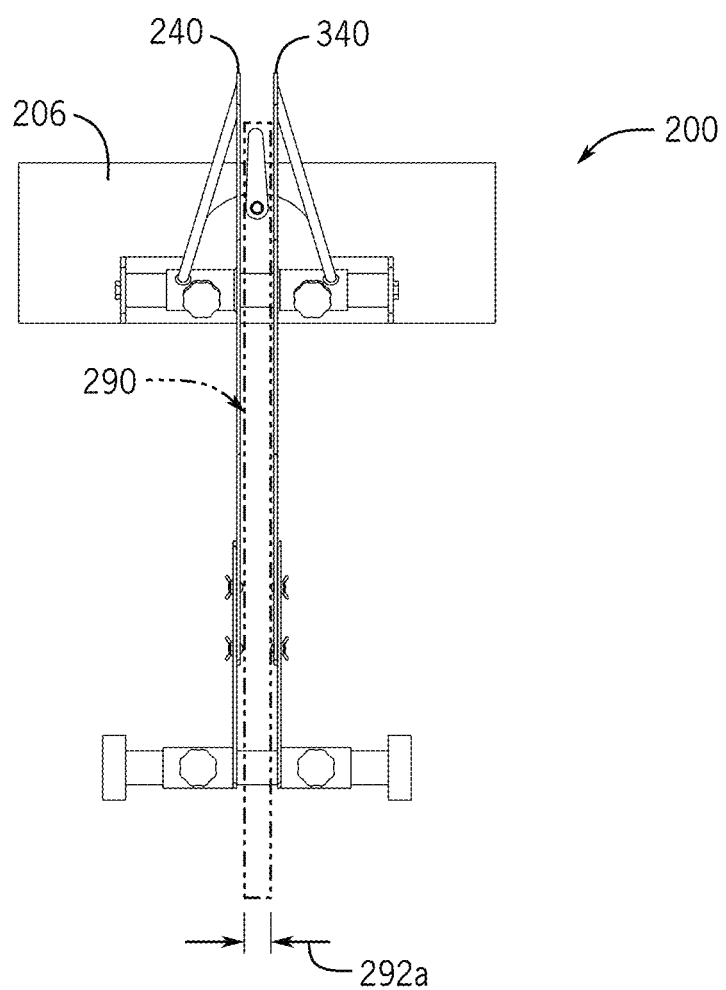

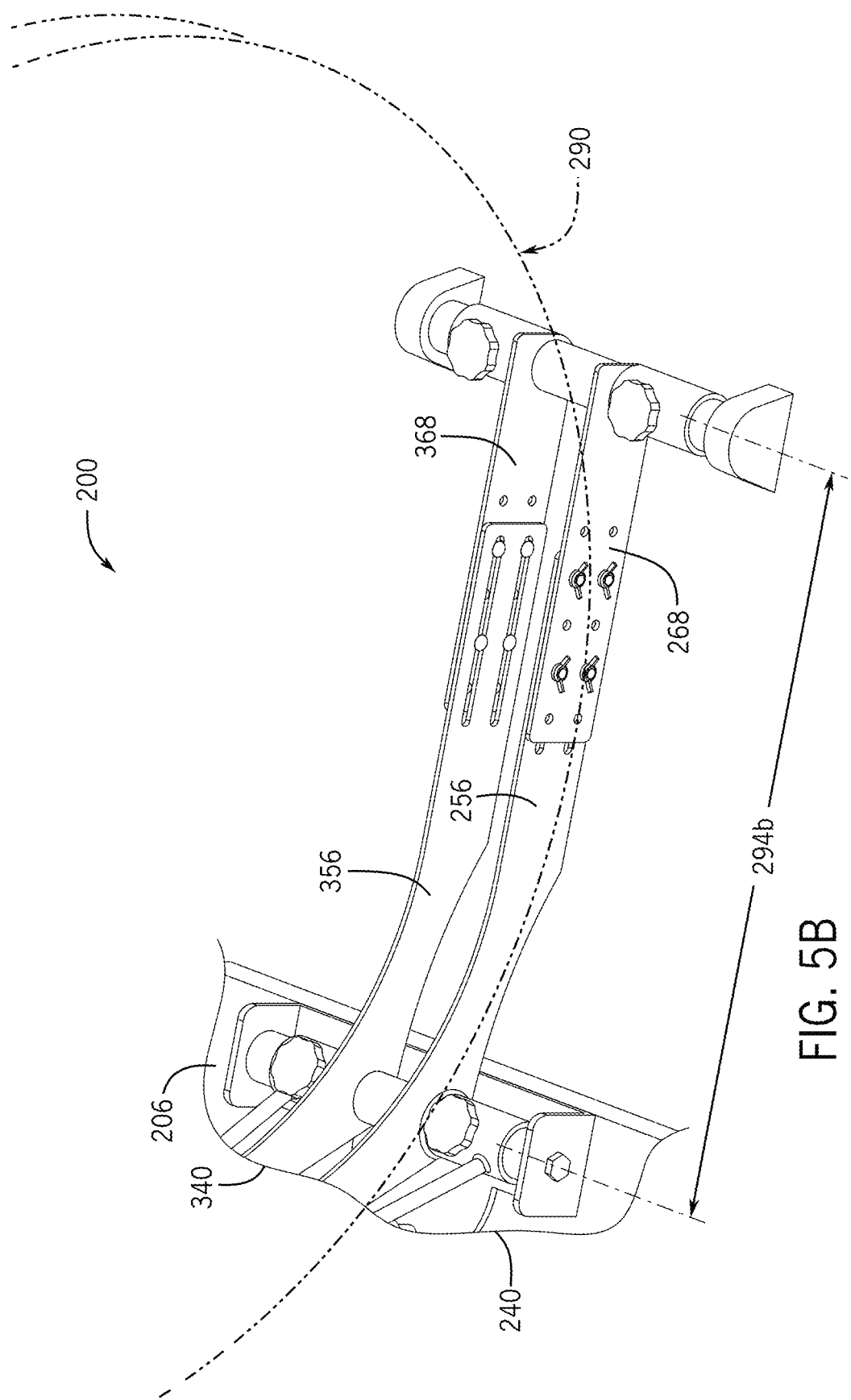

MULTI-ADJUSTMENT BICYCLE RACK FOR STORAGE AREA

FIELD

The described embodiments relate generally to storage and organization systems, and more particularly to systems and techniques for organizing bicycles of multiple sizes and types in a storage area.

BACKGROUND

Households, particularly those with children, often store bicycles of a variety of sizes, types, and configurations. Younger children who are first learning to ride a bicycle may use a balance-type bicycle, such as those without any pedals and having substantially-reduced-sized tires. Other children may use a small- or middle-wheeler-type bicycle or other reduced-frame model, which may or may not have training wheels based on the skill and preference of the child. Adult users may also have multiple bicycles, including road bicycles, electric bicycles, mountain bicycles, and so on, many of which have different tire widths and heights, as suited for particular applications and/or the characteristics and preferences of the adult user.

Traditional techniques for storing bicycles often include leaving the bicycles in a garage or shed, often in a haphazard and unplanned manner. This can be problematic where multiple bicycles of differing sizes and types are stored, and can enhance the potential for mess and clutter. Conventional storage systems for garages are often incapable of receiving bicycles of different sizes and types, and/or otherwise can limit the efficiency and compactness of bicycle storage. Not only do such systems fail to adapt to bicycle diversity, they can be cumbersome and/or overly complex in a manner that detracts from using the storage system. As such, the need continues for systems and techniques to facilitate efficient bicycle storage for various bicycles sizes and types that are usable by all members of the household.

SUMMARY

Embodiments of the present invention are directed to a bicycle rack for organizing a storage area and associated systems and methods of use thereof. The bicycle rack can be adapted to receive and hold bicycles having various diverse characteristics, and store the bicycles in a space-efficient manner. A tire receiving zone for the bicycle can, for example, have an adjustable width and depth in order to accommodate bicycles of different tire sizes. The tire receiving zone can also, for example, have an adjustable orientation to store bicycles at an angular position relative to a wall or other reference point. Multiple bicycle racks can be associated with one another in a garage or storage area to define a system of modular racks, each having a particularly tuned width, depth, and orientation to increase the space efficiency of the area, based on particular characteristics of the bicycles stored therein. The bicycle racks are further adjustable for new bicycles or new bicycle configurations, allowing for an adaptable system that can meet changing storage needs over time.

While many embodiments are described and contemplated herein, in an embodiment, a bicycle rack for organizing a storage area is disclosed. The bicycle rack includes a base. The bicycle rack further includes a mounting portion rotatably coupled with the base. The mounting portion includes a track. The bicycle rack further includes a first subassembly moveably coupled with the track. The first subassembly defines a first lateral side with a first lateral side length. The first subassembly is manipulateable between a first extended state and a first retracted state to modify the first lateral side length. The bicycle rack further includes a second subassembly movably coupled with the track. The second subassembly defines a second lateral side with a second lateral side length. The second subassembly is manipulateable between a second extended state and a second retracted state to modify the second lateral side length. The second lateral side faces the first lateral side and they are offset from one another. The bicycle rack further includes a mechanical coupling moveably coupled with the first and second subassemblies opposite the track.

The track, the first subassembly, the second subassembly, and the mechanical coupling cooperate to define a tire receiving zone that is adapted to hold and store a tire of a bicycle. The tire receiving zone has a zone width defined by the offset. The zone width is adjustable in response to moving of the first and second subassemblies along the track. The tire receiving zone further has a zone depth defined by the first and second lateral side lengths. The zone depth is adjustable in response to manipulation of each of the first and second subassemblies. The tire receiving zone further has a zone orientation defined by an angular position of the mounting portion. The zone orientation is adjustable in response to a rotation of the mounting portion relative to the base.

In another embodiment, a system for organizing a storage area is disclosed. The system includes a first bicycle rack and a second bicycle rack, such as any of the bicycle racks described herein. Each of the first and second bicycle racks has a tire receiving zone with an adaptable zone orientation, an adaptable zone width, and an adaptable zone length.

In another embodiment, a method for organizing a storage area using a bicycle rack is disclosed. The method includes providing a bicycle rack, such as any of the bicycle racks described herein. The method further includes rotating the mounting portion relative to the base. This rotating modifies the zone orientation of the tire receiving zone from a first zone orientation to a second zone orientation. The method further includes manipulating each of the first and second subassemblies. This manipulation modifies the zone depth from a first depth to a second depth. The method further includes moving the first and second subassemblies along the track. This moving modifies the zone width from a first offset between the first and second subassemblies to a second offset between the first and second subassemblies.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 4A depicts the bicycle rack having a first zone width;

FIG. 5B depicts the bicycle rack having a second zone depth; and

Figure 1A:
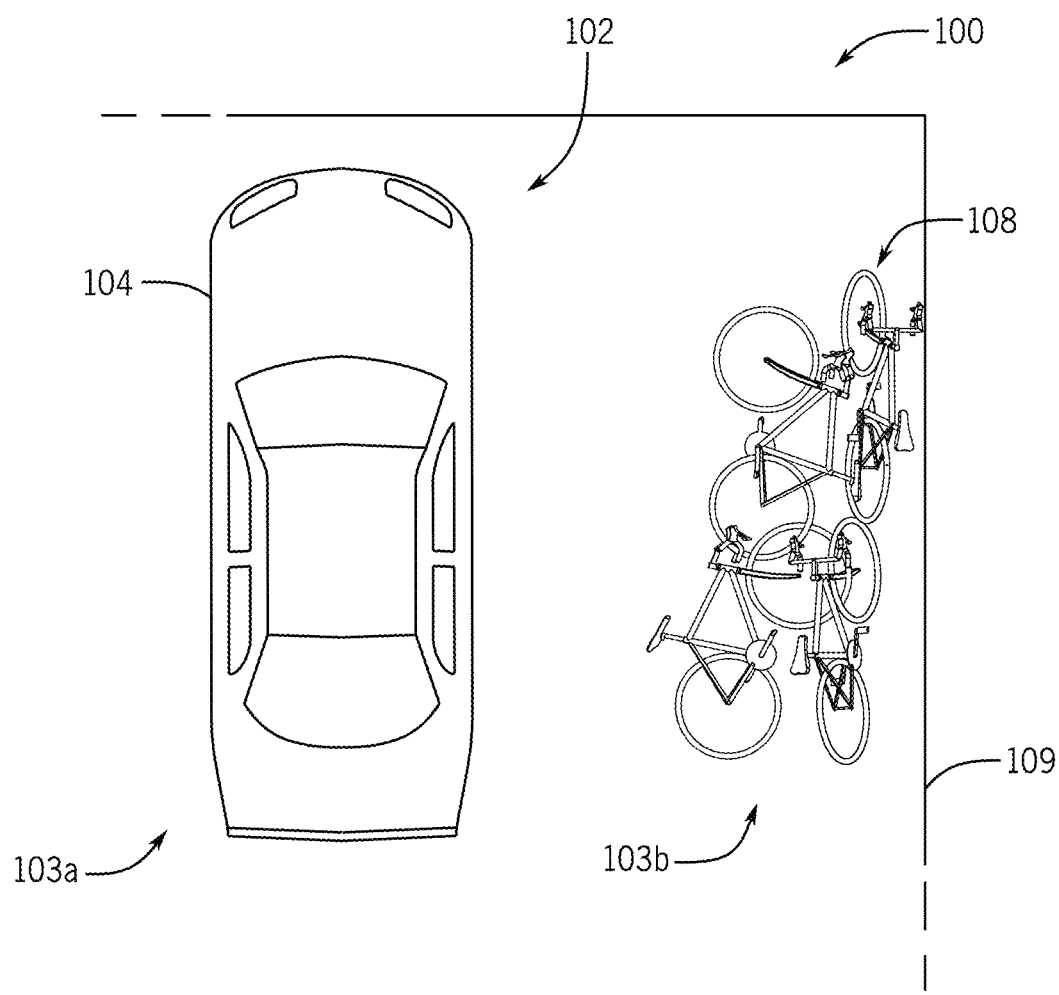
FIG. 1A depicts a storage area in a first configuration.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to bicycle organization systems. One or more bicycle racks can be used to organize a storage area, such as a garage, having bicycles of various size, types, and configurations. A bicycle rack of the present disclosure can be adaptable to accommodate a wide variety of bicycles, and arrange the bicycles in a space-efficient and highly-accessible manner. Sample bicycles can include, but are not limited to, balance-type bicycles for younger children, reduced-frame-type bicycles for older children, including models configured with and without training wheels, full-sized road bicycles, mountain bicycles, electrical bicycles, and so on. A given household may use and store multiple bicycles of these and/or other types, especially households with children of different ages and/or bicycle enthusiasts. However, haphazard and unplanned storage of bicycles often creates undue mess, clutter, trip hazards, and can reduce a footprint of a storage area available for other competing uses, including reducing a footprint available for passing through the storage area. This can be especially problematic, for example, where the bicycles are stored in a garage and can block or hinder access to a parked vehicle.

The bicycle rack and associated systems and methods of use described herein can mitigate such hindrances, thereby allowing for adaptable, accessible, and efficient bicycle storage. The bicycle rack can thus provide a flexible approach to accommodate a diversity of bicycle types, sizes, and configurations, and organize the diverse set of bicycles in a space-efficient manner in the storage area. The bicycle rack can generally be a floor-mounted or floor-placed system that defines a tire receiving zone for receiving and storing a tire of a bicycle; however, other embodiments are contemplated and described herein. The tire receiving zone can define a zone width for accommodating a width of a bicycle tire, a zone depth for accommodating a depth of diameter of a bicycle tire, and a zone orientation for orientating the bicycle tire relative to a surface or other feature. Each of the zone width, the zone depth, and the zone orientation is adaptable or adjustable to different dimensions and geometries. For example, the zone width can be adjusted to accommodate thinner and thicker tires, such as the relatively thin tires of a road bicycle, and the relatively thick tires of a mountain bicycle. As a further example, the zone depth can be adjusted to accommodate smaller and larger tire sizes, such as the relatively small tires of a balance-type bicycle, and the relatively large tires of a full-sized adult standard bicycle. As a further example, the zone orientation can be adjusted to maximize space efficiency in a given storage area, such as orientating a bicycle held by the bicycle rack at an angular offset of around 45° relative to a wall of a storage area. In other examples, other adjustments and configurations are possible.

The tire receiving zone can be defined by a first subassembly, a second subassembly, a track, and a mechanical coupling of the bicycle rack. The track can define a forward-most region of the tire receiving zone and the mechanical coupling can define a rearward-most region of the tire receiving zone. The first subassembly and the second assembly can face one another and extend between the track and the mechanical coupling. The first and second subassemblies can be associated with the track and the mechanical coupling for relative movement therewith, including sliding. In this regard, the first and second subassemblies can be moved along the track and the mechanical coupling to define an offset between the subassemblies that varies with the movement of the subassemblies. The offset between the first and second subassemblies can define the zone width, which is therefore adjustable to accommodate bicycles of differing tire width.

Each of the first and second subassemblies can include a first portion and a second portion that are manipulateable to vary the zone depth. For example, the first and second portions can collectively define a lateral side length which establishes the zone depth of the tire receiving zone. The first portion can be associated with the track and the second portion can be associated with the mechanical coupling. The first and second portions can be associated with one another and manipulateable and moveable relative therewith to vary the lateral side length, for example, effectively shortening and/or lengthening the distance between the track and the mechanical coupling. This adjustment of the first and second portions therefore allows the tire receiving zone to accommodate bicycles of differing tire lengths or diameters.

The track can be a component of a mounting portion that is rotatably coupled with a base of the bicycle rack. In certain examples, the track can pivot between a first angular orientation and a second angular orientation. The association of the track with the first and second subassemblies, discussed above, allows orientation of track relative to the mounting portion to define the zone orientation of the tire receiving zone. A user can thus set the zone orientation at any desired value, such as having a stored bicycle arranged at a substantially 45° angular offset relative to a wall of a storage area of a garage.

The bicycle rack of the present disclosure can be grouped with other racks to form a system for organizing a storage area. In one embodiment, the bicycle rack can be modular components, allowing a user to group any appropriate number of bicycle racks with one another based on usage and space requirements. In other cases, the system may include a set number of racks or stalls, such as having two, three, four, or more stalls or tire receiving zones. Where multiple bicycles are stored, each tire receiving zone can be adapted to the particular characteristics of a corresponding bicycle, such as having some tire receiving zones adapted for use with bicycles used by children, whereas others are adapted for use with bicycles largely used by adults. The angular orientation of each bicycle and the bicycles among the set can be adjusted to minimize the overall footprint of the system.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, skills, and knowledge of the relevant art are within the scope of the present inventive aspects.

FIG. 1A depicts a storage area 100 in a first configuration. The storage area 100 can be a garage, a shed, an out building, a barn, or other storage area in which a bicycle can be held for a period of time. For purposes of illustration, the storage area 100 is shown as a garage. The storage area 100 can therefore be used to accommodate a variety of uses and storage needs, where each of which can require distinct uses of space. In the example of FIG. 1A, the storage area 100 includes floor space 102 which generally defines a total available footprint of storage area 100 for the use and storage of items thereon. The floor space 102 is shown in FIG. 1A as having a first space portion 103a and a second space portion 103b. The first space portion 103a can be a region of the floor space 102 that is used to store a vehicle, such as vehicle 104 of FIG. 1A. It will be appreciated that the vehicle 104 is shown for purposes of illustration, and that in other cases, other and/or additional vehicles can be stored in the first space portion 103a; in other cases, the first space portion 103a can be used to store non-vehicular items, including sporting equipment, farm equipment, household items, and so on.

The floor space 102 is also shown as including the second space portion 103b. The second space portion 103b can be a region of the floor space 102 that is used to store bicycles of various types, sizes, and configurations, such as the bicycles 108 of FIG. 1A. The bicycles 108 of FIG. 1A are stored in a haphazard and unplanned manner. For example, the bicycles 108 are positioned at various orientations and offsets relative to one another, and with respect to the vehicle 104 that is arranged at the adjacent first space portion 103a. As discussed above and shown in FIG. 1A, the arrangement of the bicycles 108 reduces the space efficiency of the floor space 102, which can detract from other uses of the storage area 100, such as accessing the vehicle 104.

Figure 1B:
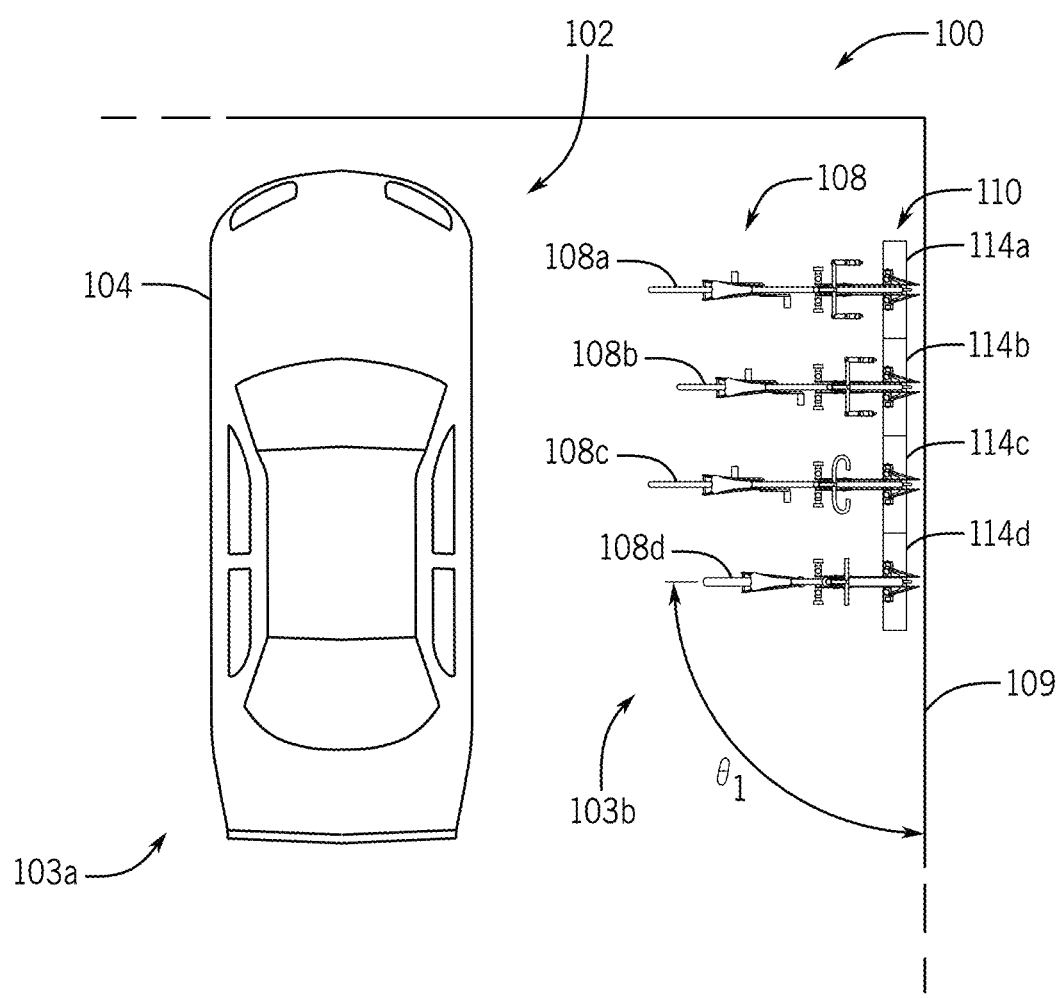
FIG. 1B depicts a storage area in a second configuration.

With reference to FIG. 1B, the storage area 100 is in a second configuration. In the second configuration of FIG. 1B, the storage area 100 includes an organization system 110 for storing the bicycles 108 within the second space portion 103b. The organization system 110 can include one or more bicycle racks, such as any of the bicycle racks discussed above and described in greater detail below. In the example of FIG. 1B four such bicycle racks are shown, a first bicycle rack 114a, a second bicycle rack 114b, a third bicycle rack 114c, and a fourth bicycle rack 114d. The bicycle racks 114a, 114b, 114c, 114d are shown holding, respectively, one of a first bicycle 108a, a second bicycle 108b, a third bicycle 108c, and a fourth bicycle 108d. Each of the bicycles 108a-108d can be a different size, type, configuration, and so on. As described in greater detail with respect to FIG. 2, the bicycle racks can each be individually adjustable to the particular characteristics of the bicycle with which the rack is associated. This can include adjusting the bicycle racks 114a-114d individually to accommodate differing width tires (e.g., the relative thin tires of a road bicycle versus the relatively thick tires of a mountain bicycle). This can further include adjusting the bicycle racks 114a-114d individually to accommodate differing tire sizes (e.g., the relatively small tires of a children balance-type bicycle versus the relatively large tires of a standard adult bicycle).

In the arrangement of FIG. 1B, the bicycle racks 114a-114d are arranged generally along a wall 109. The wall 109 can be a generally vertical wall of the storage area 100 or garage and define an assembly direction along which the bicycle racks 114a-114d are arranged. In FIG. 1B, the bicycle rack 114a-114d can generally be modular components of the organization system 110. In this regard, more or fewer racks can be associated with the system 110 as needed for space and use requirements. A modular construction can also allow the bicycle racks 114a-114d to be spaced apart from one another as needed, for example, where racks holding larger-sized bicycles can be spaced further apart from one another as compared to racks holding smaller-sized bicycles. Additionally or alternatively, an alignment structure can be provided (not shown in FIG. 1B) in order to connect individual modules of the bicycle racks 114a-114d to one another. The alignment structure, for example, could be a guide, bar, track, or other mount positionable along the floor space 102 and the bicycle racks 114a-114d could be connected to the alignment structure. In some cases, the alignment structure and at least some portion of the bicycle racks 114a-114d can be integrally formed structures.

The organization system 110 can be used to arrange the bicycles at a desired orientation within the storage area 100. In FIG. 1B, each of the bicycles 108 is shown at a first orientation $\theta_1$ relative to the assembly direction or wall 109. The first orientation $\theta_1$ can be a generally perpendicular orientation of 90° relative to the assembly direction or wall 109. With the first orientation $\theta_1$ the bicycle 108 can extend from the wall 109 and towards the vehicle 104 along a substantially straight path.

Figure 1C:
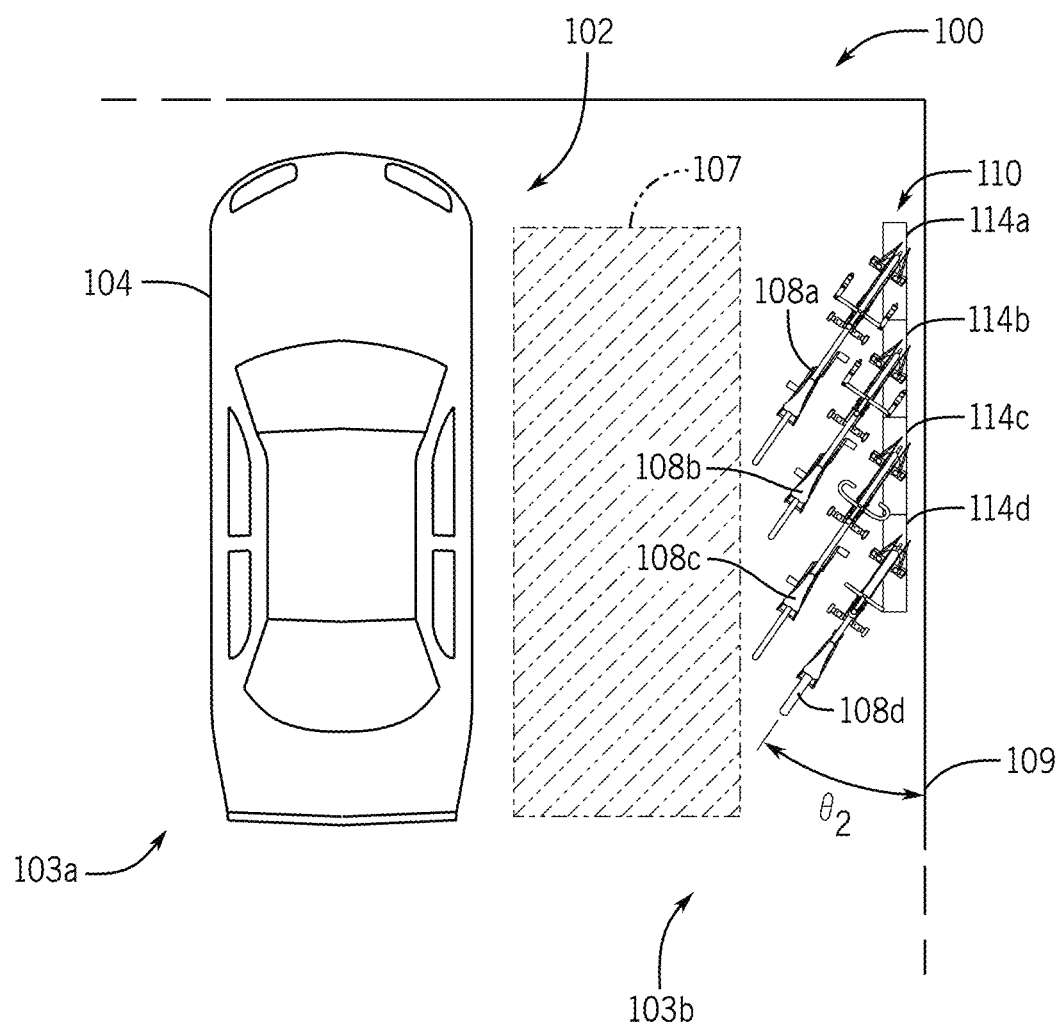
FIG. 1C depicts a storage area in a third configuration.

The bicycle racks of the present disclosure can facilitate storage of bicycles by minimizing their footprint with a storage space during storage. In this regard and as described in greater detail with reference to FIGS. 2A-2D, the bicycle racks 114a-114d can each individually rotate relative to the assembly direction. As shown in FIG. 1C, for example, each of the bicycle racks 114a-114d is rotated relative to the wall 109 to position the bicycles generally at a second orientation $\theta_2$. At the second orientation $\theta_2$, the bicycles 108 can generally be arranged at a 45° angular off set from the wall 109. This can reduce a footprint of the bicycles 108 within the second space portion 103b. As shown in FIG. 1C, when the bicycles 108 are at the second orientation $\theta_2$, the second space portion 103b can include an optimized region 107. The optimized region 107 can generally be between the bicycles 108 and the vehicle 104 and thus facilitate increased access to the vehicle 104. The orientation of the bicycle 108 can also facilitate removal of the bicycles from the organization system 110.

FIGS. 2A-2D depict a bicycle rack 200. The bicycle rack 200 can be any one of or all of the bicycle racks 114a-114d described above in relation to FIGS. 1B and 1C. In this regard, the bicycle rack 200 can be adapted to hold and store bicycles of various sizes, types, and configurations. The bicycle rack 200 can also be manipulateable in order to orientate the bicycles within a storage space, which can help reduce a footprint of stored bicycles in the storage space.

Figure 2A:
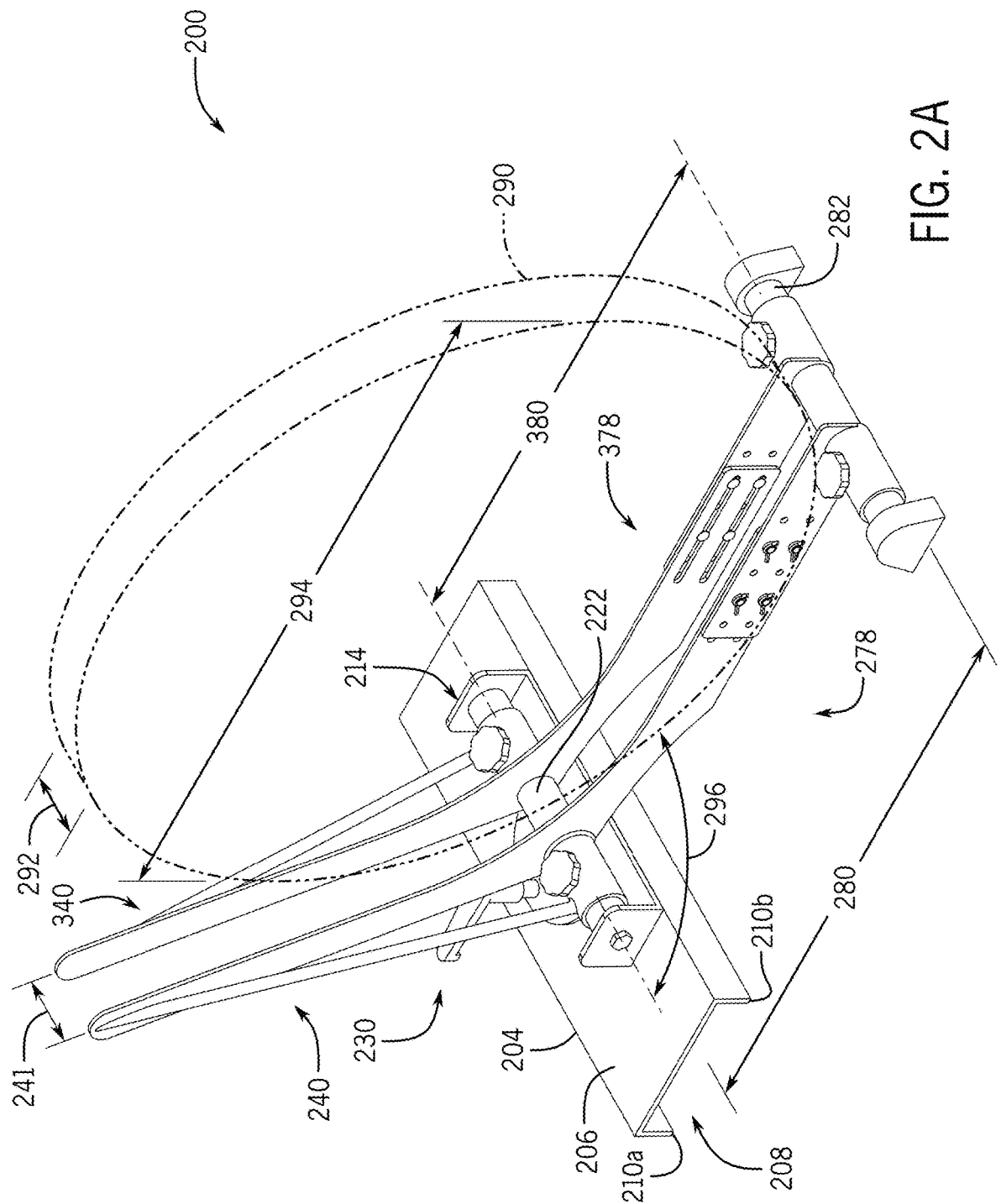
FIG. 2A depicts a sample bicycle rack.

As shown in FIG. 2A, the bicycle rack 200 can include a base 204. The base 204 can be adapted to position and in some cases anchor the bicycle within a given storage area, such as a garage. The base 204 can generally define a stationary portion of the bicycle rack 200, and other components of the bicycle rack 200 can move, such as pivot, slide, and so on relative to the base 204. In this regard, the base 204 can be arranged adjacent a wall or other reference feature of a storage area, and the bicycle received by the bicycle rack 200 can be orientated with respect to the reference feature.

The base 204 includes an elongated member that defines an engagement portion 206, and legs 210a, 210b. The legs 210a, 210b can extend from opposing ends of the engagement portion 206 and facilitate stabilizing the base 204 within the storage area. The base 204 is also shown as including a hollow channel 208 defined by a region between the legs 210a, 210b and extending through the base 204; however, this is not required. In other cases, the base 204 can be substantially solid and continuous throughout its center. In certain examples, the base 204 is constructed in a manner to facilitate the connection of the bicycle rack 200 with an alignment structure or other devices to establish an organization system (e.g., such as the organization system 110 of FIGS. 1B and 1C). For example, the hollow channel 208 can be adapted to receive an alignment structure (such as a bar) arranged along the storage area. Additionally or alternatively, holes, grooves, and/or other connecting features can be integrated with the base to facilitate such connections.

The bicycle rack 200 also includes a mounting portion 214. The mounting portion 214 is associated with the base 204 and configured for movement relative thereto. For example, the mounting portion 214 can be associated with the base 204 and be configured to pivot relative to the base 204 between at least a first orientation and a second orientation. As described herein, this association can facilitate the space-efficient storage of a bicycle in a storage area, for example, by storing the bicycle at the first, the second, or another orientation in order to maximize space with in a storage area.

Figure 2B:
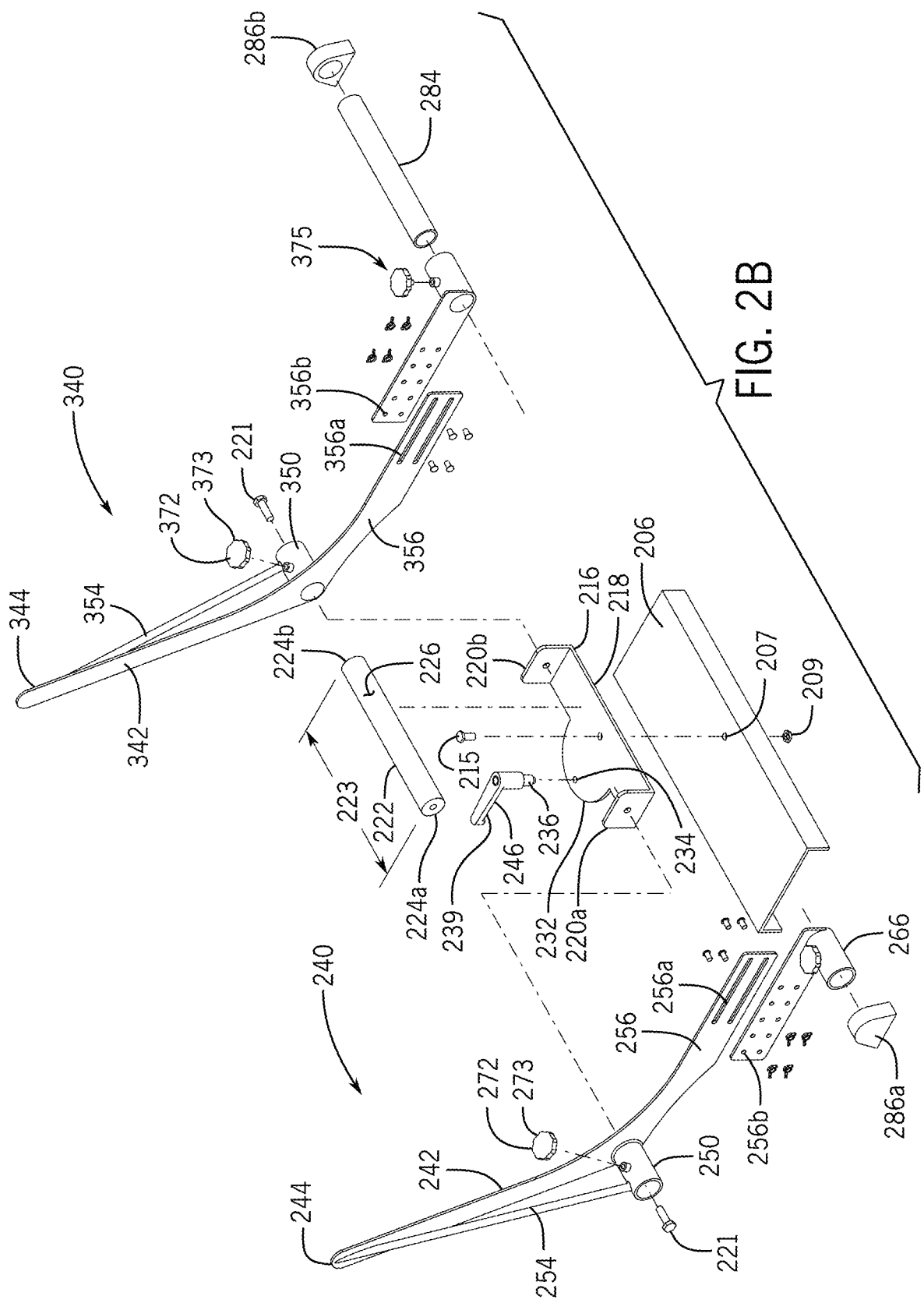
FIG. 2B depicts an exploded view of the bicycle rack.

The mounting portion 214 can include at least a track 222 and a holder 216, as shown in FIG. 2B. The track 222 can be an elongated member that defines a path of travel 223 between a first end 224a and a second end 224b. The path of travel 223 can be defined along a curved surface 226 of the track 222 and define a direction of movement of the subassemblies of the bicycle rack 200 that cooperate to accommodate bicycle tires of various widths. The holder 216 can be used to support the track 222 above the base 204. The holder 216 can in certain examples be a U-shaped member having a bridge 218 with a first wing 220a and a second wing 220a extending from opposing ends of the bridge 218. The first end 224a of the track 222 can be connected to the holder 216 at the first wing 220a and the second end 224b of the track 222 can be connected to the holder 216 at the second wing 220b. In some cases, fasteners 221 can be provided to connect the track 222 and the holder 216 to one another, as shown in FIGS. 2A and 2B. While many configurations are possible, the track 222 can be connected to the holder 216 so that it is substantially above and/or offset from the bridge 218. This can allow a cart or other feature to be support and glide along the track 222 without interference from the bridge 218 positioned below.

The holder 216 can also include or be associated with various components to facilitate the connection of the mounting portion 214 with the base 204 In some cases, the rotational axis member 215 can be a screw, a rod, a bar, or the like that is received by both the holder 216 and the base 204. In other cases, some or all of the rotational axis member 215 can be integrally formed with the holder 216. In one example, the mounting portion 214 can include a rotational axis member 215. The rotational axis member 215 can extend substantially perpendicularly from the holder 216, in a direction generally opposite the first and second wings 220a, 220b, and be received by the base 204. This receipt can establish a rotational association between the mounting portion 214 and the base 204. To illustrate, the base 204 can include an opening 207 and the rotational axis member 215 can be a rod that extends through the opening 207. A nut 209 can be provided to prevent exit of the rotational axis member 215 from the opening 207, while allowing the rotational axis member 215 to rotate within the opening 207. In this regard, the mounting portion 214 can be configured to pivot relative to the base about the opening 207.

The mounting portion 214 can also include or be associated with a rotational locking mechanism 230 and associated features that cooperate to releasably fix an orientation of the mounting portion 214 relative to the base 204. In this regard, the mounting portion 214 can be adapted to be fixed in a secure manner at a first angular orientation relative to the base 204, and subsequently be manipulated so that the mounting portion 214 is fixed in a secure manner at a second angular orientation relative to the base 204. In the example of FIGS. 2A-2D, the mounting portion 214 includes a landing 232 that extends from the holder 216 and that defines a structural component for supporting the components of the rotational locking mechanism 230 above the base 204. In particular, the landing 232 can be arranged directly above the engagement portion 206 of the base 204 and move relative to an exterior surface of the engagement portion 206 in response to the rotational movement of the mounting portion 214 relative to the base 204. The rotational locking mechanism is integrated with the landing 232 so that the rotational locking mechanism 230 can engage the engagement portion 206 of the base 204 and can selectively prevent relative movement of the mounting portion 214 relative to the base 204 at a desired orientation.

In one example, the rotational locking mechanism 230 includes a protrusion 236 that extends from the landing 232 to selectively prevent relative movement of the mounting portion 214 relative to the base 204. The protrusion 236 can be a resiliently biased protrusion, biased toward the base 204. In a proud configuration, the protrusion 236 can exert a force on the engagement portion 206 that restricts movement of the mounting portion 214, for example, due to a friction or interference fit with an exterior surface of the engagement portion 206. Additionally or alternatively, holes, or other features, can be provided through or partially through the engagement portion and the protrusion 236 can be received within the holes of the engagement portion 206. In a retracted configuration, the protrusion 236 can be pulled away from the engagement portion 206 and the mounting portion 214 is allowed to rotate freely relative to the base 204.

To facilitate the foregoing, the landing 232 can include an opening 234 and the protrusion 236 can extend through the opening 234. The protrusion 236 can be associated with a handle 239 and a biasing element at the landing 232 opposite the base 204. The biasing element can be arranged substantially within the handle 239 or otherwise integrated therewith relative to the protrusion 236 and the handle 239 so that the protrusion 236 is biased proud toward the engagement portion 206. A user can then manipulate the handle 239 in order to retract or otherwise pull the protrusion 236 away from the engagement portion 206. It will be appreciated, however, that in this certain embodiment, the biasing element can be omitted. For example, the handle 239 can be associated with the protrusion 236 in order to advance the protrusion 236 along a threaded connection or other fastening members to secure the protrusion 236 in a position in which the protrusion imparts a force on the engagement portion 206. The handle 239 could be further manipulated to reverse the movement of the protrusion 236 to release the imparted force and facilitate movement of the mounting portion 214 and the base 204 relative to one another.

Figure 2C:
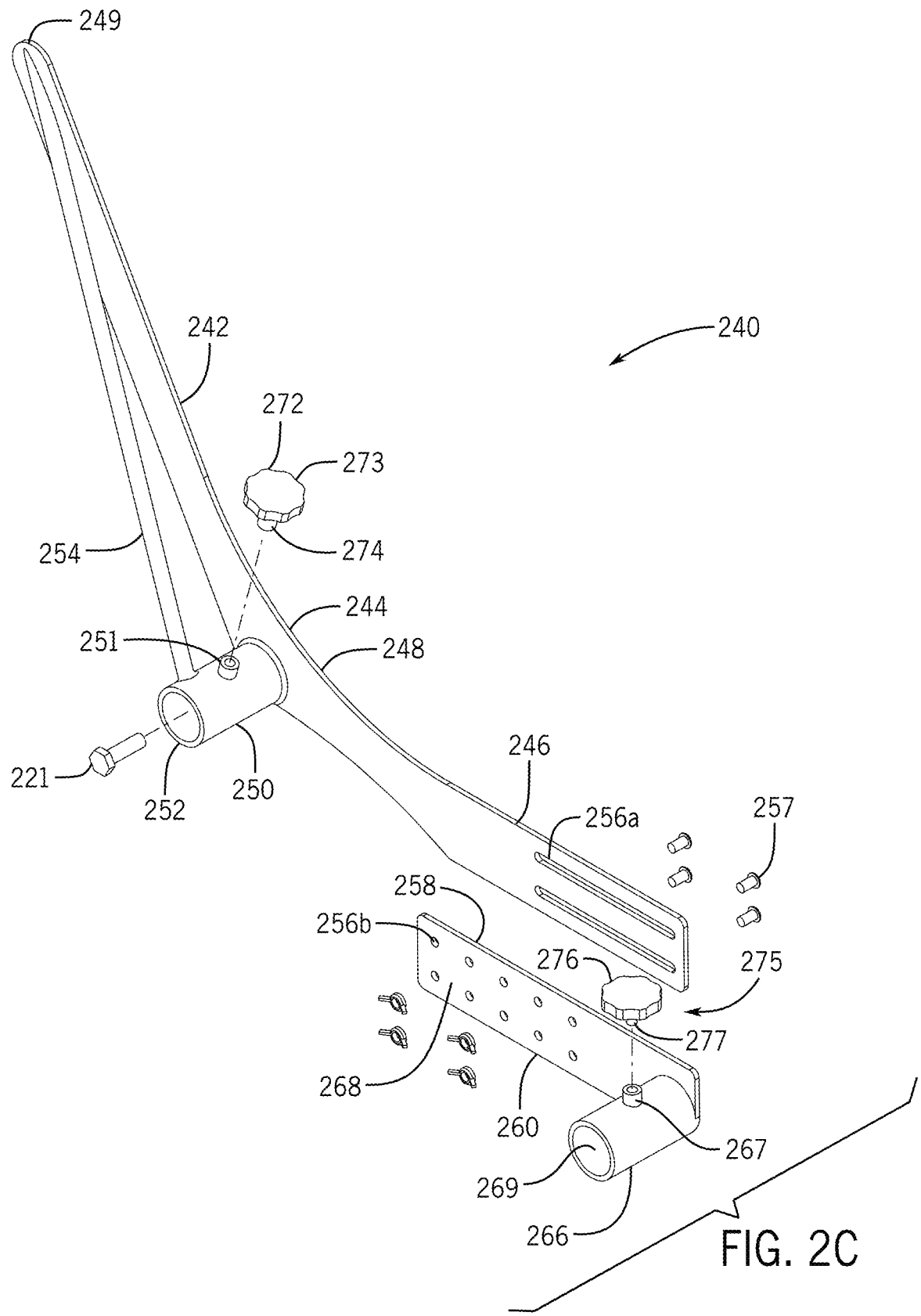
FIG. 2C depicts an exploded view of a first subassembly of the bicycle rack.
Figure 2D:
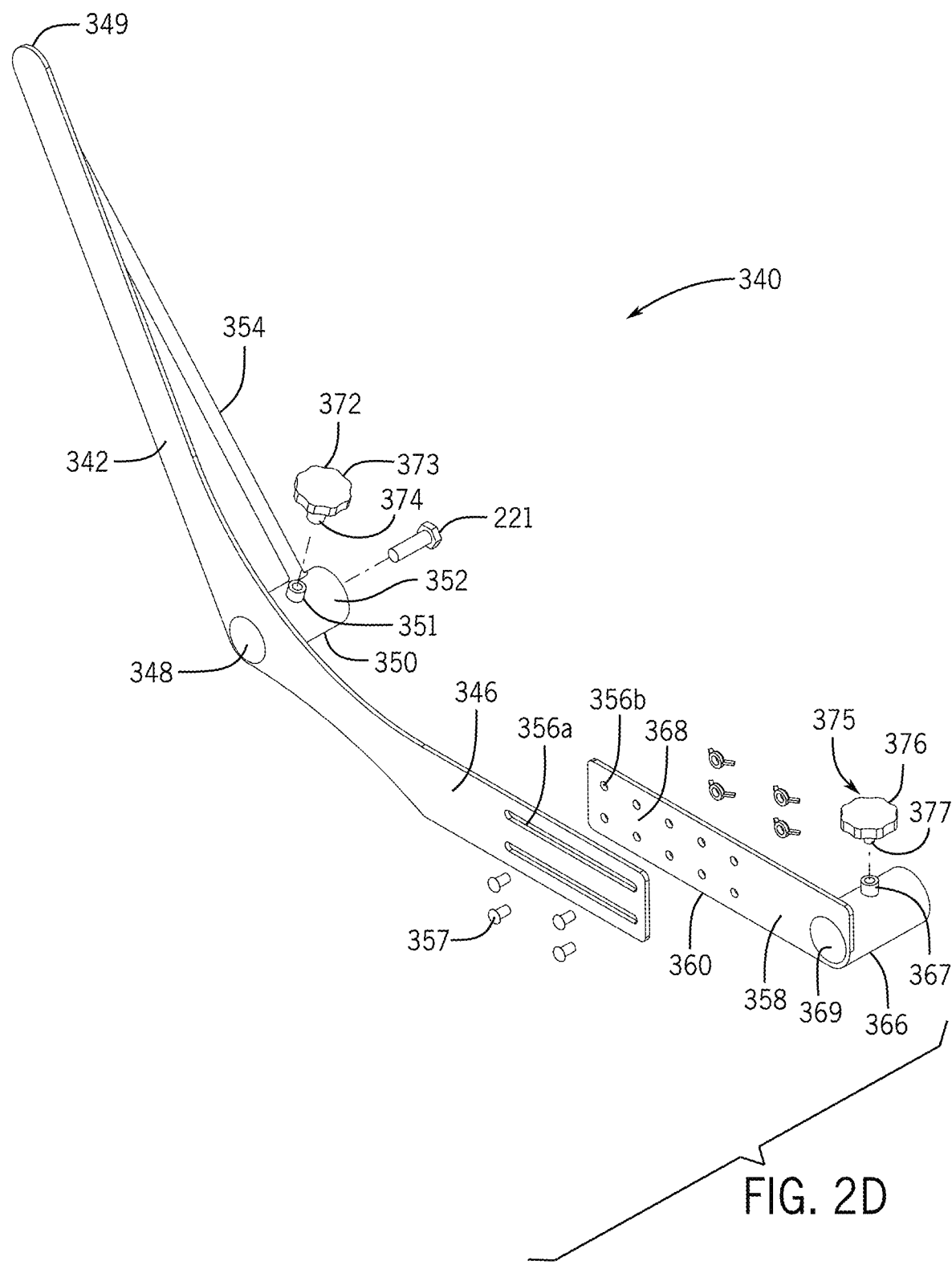
FIG. 2D depicts an exploded view of the second subassembly of the bicycle rack.

The bicycle rack 200 also includes a first subassembly 240 and a second subassembly 340. FIG. 2C depicts an exploded view of the first subassembly 240 and FIG. 2D depicts an exploded view of the second subassembly 340. The first and second subassemblies 240, 340 can be associated with the mounting portion 214. For example, each of the first and second subassemblies 240, 340 can be movably coupled with the mounting portion 214 along the track 222. In some cases, the first and second subassemblies 240, 340 can slide along the track 222, such as slide along the path of travel defined by the track 222 between the first and second ends 224a, 224b. Other relationships are possible and contemplated herein, including the first and second subassemblies 240, 340 being movably coupled to the track 222 via a ratchet-type mechanism, a cam/cam-follower arrangement, and/or other arrangement.

The first and second subassemblies 240, 340 can be associated with the track 222 so that each face one another and are separated by an offset 241. The offset 241 between the first and second subassemblies 240, 340 can define a width of a region of the bicycle rack 200 that receives a bicycle tire. As such, the first and second subassemblies 240, 340 are movable along the track 222 to adjust the offset 241 and therefore facilitate the bicycle rack 200 accommodating bicycle tires of different widths.

The first and second subassemblies 240, 340, can also define, respectively, a first lateral side 278 with a first lateral side length 280, and a second lateral side 378 with a second lateral side length 380. The first and second lateral side lengths 280, 380 can define a depth of a region of bicycle rack 200 that receives a bicycle tire. As such, the first and second subassemblies 240, 340 can be manipulated between a retracted and an extended state to modify the first and second lateral side lengths 280, 380 and therefore facilitate the bicycle rack 200 accommodating tires of different diameters.

The first and second subassemblies 240, 340 can also be associated with a mechanical coupling 282. The mechanical coupling 282 can be a bar or rod or other feature that defines a support structure for the bicycle rack 200 opposite the base 204. Whereas the base 204 is generally fixed or stationary relative to a floor space of a storage area, the mechanical coupling 282 moves relative to the base 204, as directed by the mounting portion 214 and associated first and second subassemblies that extend between the track 222 and the mechanical coupling 282. In the embodiment of FIGS. 2A and 2B, the mechanical coupling 282 is shown as including an elongated portion 284 with a first foot 286a extending from a first end of the elongated portion 284 and a second foot 286b extending from a second end of the elongated portion 284. The first foot 286a and the second foot 286b can include a coating, cover, or otherwise be configured to mitigate slipping of the mechanical coupling 282 with a storage area. For example, the first foot 286a and the second foot 286b can be, or be integrated with, rubber shoes or the like, that help define a high-friction surface of the mechanical coupling 282 that is placed on the floor of storage area.

The first and second subassemblies 240, 340 can be associated with the mechanical coupling 282 in a manner that defines the first and second subassemblies 240, 340 as being movably coupled with the mechanical coupling 286. As one example, the first and second subassemblies 240, 340 can be slideably coupled with the mechanical coupling along the elongated portion 284 and travel substantially between the first foot 286a, and the second foot 286b. Other relationships are possible and contemplated herein, including the first and second subassemblies 240, 340 being movably coupled to the track 222 via a ratchet-type mechanism, a cam/cam-follower arrangement, and/or other arrangement.

The first and second subassemblies 240, 340 can cooperate with the mounting portion 214 and the mechanical coupling 282 to define a tire receiving zone 290, such as that shown in FIG. 2A. While the tire receiving zone 290 is shown as a tire shape, it will be appreciated that the tire receiving zone 290 can be any region of space defined by the components and subassemblies of the bicycle rack 200 that is adapted to receive and hold a bicycle tire. As described above, the bicycle rack 200 can generally be a floor-mounted or floor-placed system that can receive a tire of a bicycle for storage of the bicycle in a storage area. The tire receiving zone 290 can be a three-dimensional volume or region of the bicycle rack 200 that receives the tire and holds the tire in-place during storage. The tire receiving zone 290 can be bounded by the first and second subassemblies 240, 340 at the respective first and second lateral sides 278, 378. The tire receiving zone 290 can be further bounded by the mounting portion 214, such as the track 222, at a forward side of the bicycle rack 200. The tire receiving zone 290 can be further bounded by the mechanical coupling 282 at a rear side of bicycle rack 200.

The first and second subassemblies 240, 340, the mounting portion 214, and the mechanical coupling 282 can cooperate to define the dimensions and geometry of the tire receiving zone 290. In this manner, the tire receiving zone 290 can be tailored to hold a bicycle tire based on the particular characteristics of the bicycle tire, such as based on the width and/or diameter of the tire. To facilitate the foregoing, the tire receiving zone 290 can define a zone width 292 and a zone depth 294. The zone width 292 can be defined by or otherwise be equivalent to the offset 241 between the first and second subassemblies 240, 340. A dimensional value of the zone width 292 can therefore be adjusted based on the movement of the first and second subassemblies relative to the track 222, as described herein. The zone depth 294 can be defined by or otherwise be equivalent to the first and second lateral side lengths 280, 380 of the first and second subassemblies 240, 340, respectively. A dimensional value of the zone depth 294 can therefore be adjusted based on the manipulation of the first and second subassemblies 240, 340 between the respective retracted and extended states. The tire receiving zone can also define a zone orientation 296. The zone orientation 296 can be defined by an angular position of the mounting portion 214 relative to the base 204. A dimensional value of the zone orientation 296 can therefore be adjusted based on the rotation of the mounting portion 214 relative to the base 204, thereby facilitating space-efficient storage of the bicycle at a given angle.

To facilitate the foregoing adjustments of the tire receiving zone 290, the first subassembly 240 can generally include a first portion 242 and a second portion 258. As shown in FIG. 2C, the first portion 242 can be engaged with the track 222 and the second portion 258 can be engaged with the mechanical coupling 282. The first and second portions 242, 258 can be associated with one another and manipulateable relative thereto the adjustment of the first lateral side length 280. In this regard, the first and second portion 242, 258 can cooperate to define the first lateral side length 280 and can be movable relative to one another to define a first extended state of the first subassembly 240 and a second retracted state of the first subassembly 240. The first lateral side length 280 can have a first value at the first extended state and a second value at the second extended state. In this regard, the tire receiving zone 290 can have the zone depth 294 with a dimension value corresponding to the differing values of the lateral side length 280 to accommodate differing sized bicycle tires. The first and second portions 242, 258 can define through portions 256a, 256b therethrough and arranged serially along the first lateral side length 280. Fasteners 257 can be provided and used to releasably fix the first and second portions 242, 258 to one another at the desired position. It will be appreciated that various types of fasteners can be used to facilitate the foregoing, including embodiments, with clips, screws, and the like, which can be optionally integrated with quick-release type features.

In the embodiment of FIGS. 2A-2D, the first portion 242 generally includes an arcuate portion 244, a forward cart structure 250, and an angular brace 254; however, other configurations are possible and contemplated herein. The arcuate portion 244 can be a plate, bar, or other feature that extends from the second portion 258 and to the track 222. The arcuate portion 244 can have an engagement region 246, for example, that is adapted for associating the first portion 242 with the second portion 258. The engagement region 246 has or defines the through portions 256a. The engagement region 246 can extend substantially linear from the second portion 258, along a ground or floor of a storage area, and to an elbow 248 of the arcuate portion 244. At the elbow 248, the arcuate portion 244 can be curved and extend substantially along or towards a vertical direction and to an end region 249 of the arcuate portion 244 that can define at least part of a height of the tire receiving zone 290. In some cases, the arcuate portion 244 can match the general shape and contour of a bicycle tire, and thus the curvature of the arcuate portion 244 can help stabilize the bicycle tire within the tire receiving zone 290.

The first portion 242 also includes the forward cart structure 250. The forward cart structure 250 is used to movably couple the first portion 242 to the track 222. For example, the forward cart structure 250 can define a track opening 252 and the track 222 can be received from the track opening 252. Where a ratchet or other mechanical is used, the forward cart structure 250 can include the ratchet feature therein. As shown in FIG. 2C, the forward cart structure 250 is adapted for sliding along the track 222. The arcuate portion 244 can be connected to the forward cart structure 250 at the elbow 248. As such, the sliding of the forward cart structure 250 along the track 222 slides the arcuate portion 244, and first portion 242 more generally, along the track 222. The angular brace 254 can extend from the forward cart structure 250 to the end region 249 of the arcuate portion 244 helping stabilize an uppermost end of the first portion 242.

A forward locking mechanism 272 is shown in FIG. 2C as being associated with the first subassembly 240. The forward locking mechanism 272 can be used to releasably fix the forward cart structure 250 at a desired location along the path of travel 223 of the track 222. For example, the forward locking mechanism 272 can include a rotational handle 273 that is used to rotate a threaded portion 274. The forward cart structure 250 includes corresponding threads 251 that extend through a complete thickness of the forward cart structure 250 and are operable to receive the threaded portion 274. In this regard, at the desired location, a user can rotate the rotational handle 273 and cause the threaded portion 274 to extend through the corresponding threads 251 and press against the track 222 that is received through the track opening 252.

In the embodiment of FIGS. 2A-2D, the second portion 258 generally includes an elongated portion 260 and a rear cart structure 266; however, other configurations are possible and contemplated herein. The elongated portion 260 can be a plate, bar, or other feature that extends from the first portion 242 and to the mechanical coupling 282. The elongated portion 260 has an engagement region 268, for example, that is adapted for associating the second portion 258 with the first portion 242. The engagement region 268 can have or define the through portions 256b. The engagement region 268 can extend substantially linear from the first portion 242, along a ground or floor of a storage area, and to the rear cart structure 266.

The rear cart structure 266 is used to movably couple the second portion 258 to the mechanical coupling 282. For example, the rear cart structure 266 can define a coupling opening 269 and the mechanical coupling 282, such as at the elongated portion 284, can be received from the coupling opening 269. Where a ratchet or other mechanical is used, the rear cart structure 266 can include the ratchet feature therein. In this embodiment, the rear cart structure 266 is adapted for sliding along the elongated portion 284 of the mechanical coupling 282. The elongated portion 260 can be connected to the rear cart structure 266 at the elbow 248. As such, the sliding of the rear cart structure 266 along the mechanical coupling 282 slides the elongated portion 260, and second portion 258 more generally, along the mechanical coupling 282.

A rear locking mechanism 275 is shown in FIG. 2C as being associated with the first subassembly 240. The rear locking mechanism 275 can be used to releasably fix the rear cart structure 266 at a desired location along the mechanical coupling 282. For example, the rear locking mechanism 275 can include a rotational handle 276 that is used to rotate a threaded portion 277. The rear cart structure 266 includes corresponding threads 267 that extend through a complete thickness of the rear cart structure 266 and are operable to receive the threaded portion 277. In this regard, at the desired location, a user can rotate the rotational handle 276 and cause the threaded portion 277 to extend through the corresponding threads 267 and press against the mechanical coupling 282 that is received through the coupling opening 269.

It will be appreciated that the second subassembly 340 can be substantially analogous to the first subassembly 240 described above. In this regard, the second subassembly 340, as depicted in FIG. 2D, can include: a first portion 342, an arcuate portion 344, an engagement region 346, an elbow 348, an end region 349, a forward cart structure 350, corresponding threads 351, a track opening 352, an angular brace 354, through portions 356a, 356b, fasteners 357, a second portion 358, an elongated portion 360, a rear cart structure 366, corresponding threads 367, a coupling opening 368, a forward track locking mechanism 372, a rotational handle 373, a thread portion 374, a rear track locking mechanism 375, a rotational handle 376, and a threaded portion 377; redundant explanation of which is omitted here for clarity.

Figure 3A:
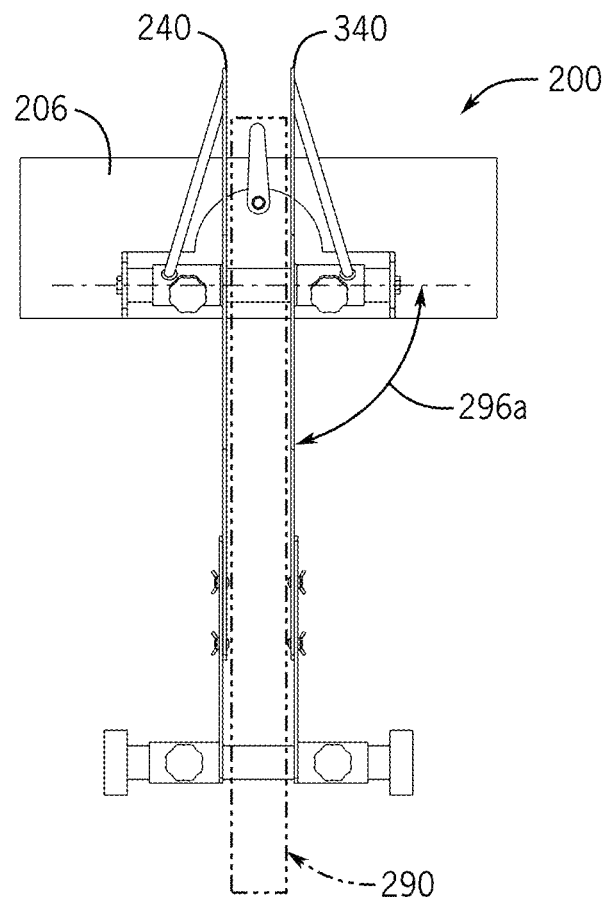
FIG. 3A depicts the bicycle rack having a first zone orientation.
Figure 3B:
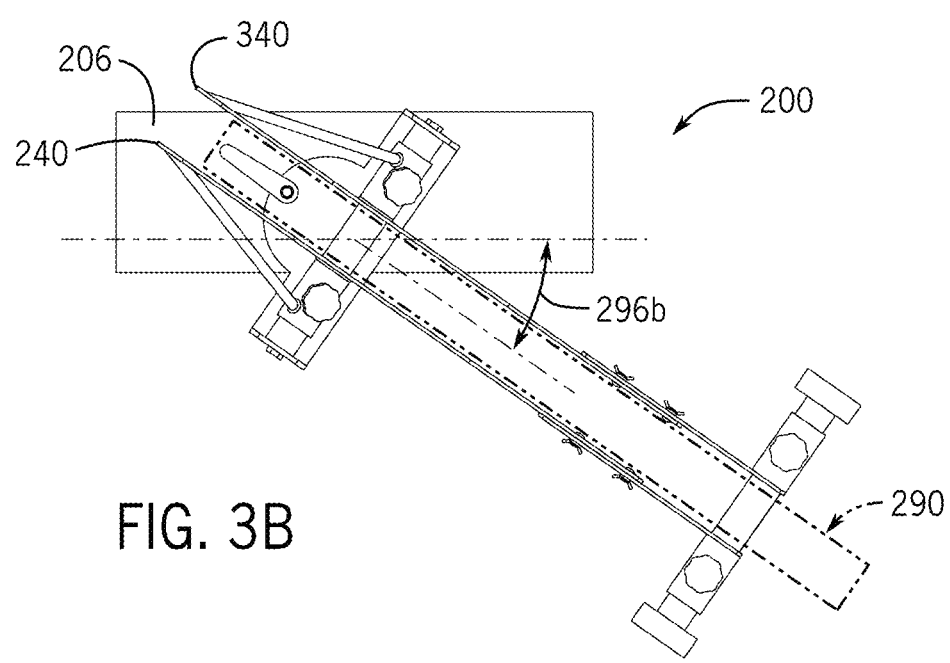
FIG. 3B depicts the bicycle rack having a second zone orientation.

With reference to FIGS. 3A-3B, the bicycle rack 200 is shown being manipulated between a first angular position and a second angular position. As described herein, the mounting portion 214 can be adapted to rotate relative to the base 204. In this manner, the tire receiving zone 290 can be correspondingly rotated. This can allow a bicycle tire received and/or held by the tire receiving zone 290 to be stored within a storage area in a space-efficient manner. In this regard, FIG. 3A shows the tire receiving zone 290 at a first angular position 296a relative to the base 204. The first angular position 296a can correspond to a substantially perpendicular arrangement of a bicycle stored using the tire receiving zone 290 (e.g., such as that shown in FIG. 1B). The mounting portion 214 can be rotated relative to the base 204 in order to define a second angular position 296b, as shown in FIG. 3B. The second angular position 296b can correspond to a substantially 45° angle such that a bicycle stored using the tire receiving zone 290 can be orientated at a corresponding angle within a storage area (e.g., such as that shown in FIG. 1C). It will be appreciated, however, that the second angular position 296b can correspond to a variety of values, and may be adjustable in order to meet bicycle and storage area requirements.

Figure 4B:
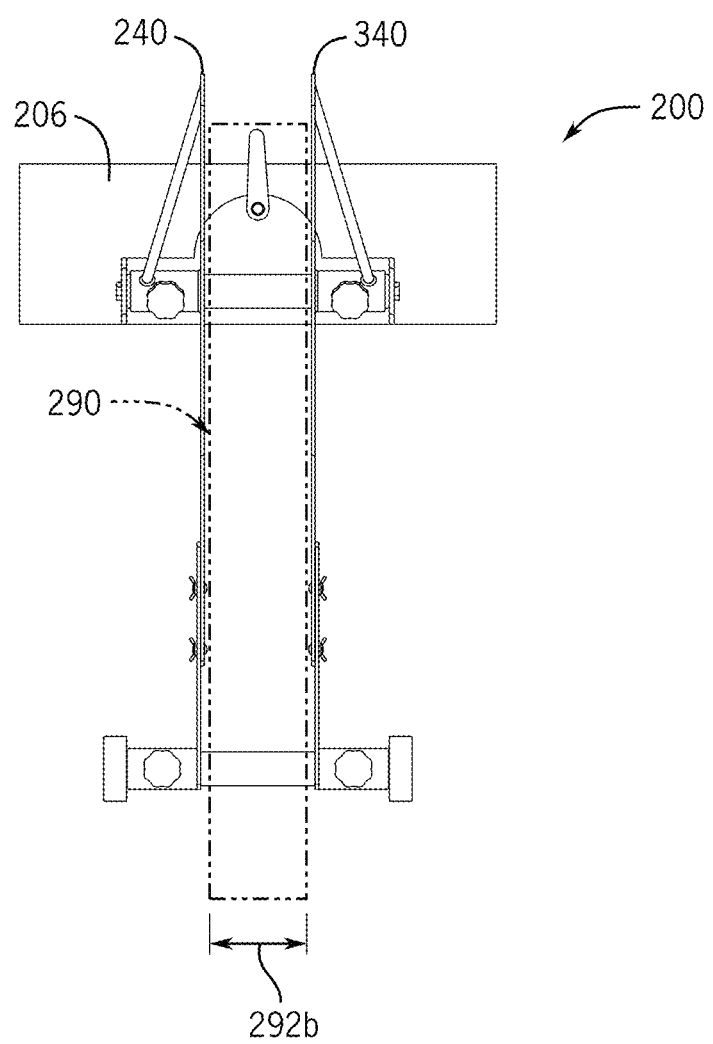
FIG. 4B depicts the bicycle rack having a second zone width.

With reference to FIGS. 4A-4B, the bicycle rack 200 is shown being manipulated between a first zone width and a second zone width. As described herein, the first and second subassemblies 240, 340 can be moved relative to one another to define a value of the offset 241. In this manner, the tire receiving zone 290 can be correspondingly manipulated to accommodate different sized tires. In this regard, FIG. 4A shows the tire receiving zone 290 at a first zone width 292a. The first zone width 292a can correspond to a substantially smaller-width tire, such as that of a road bicycle, as one example. The first and second subassemblies 240, 340 can be moved relative to one another in order to define a second zone width 292b, as shown in FIG. 4B. The second zone width 292b can correspond to a substantially larger-width tire, such as that of a mountain bicycle. It will be appreciated, however, that the second zone width 292b can correspond to a variety of values, and may be adjustable in order to meet bicycle and storage area requirements.

Figure 5A:
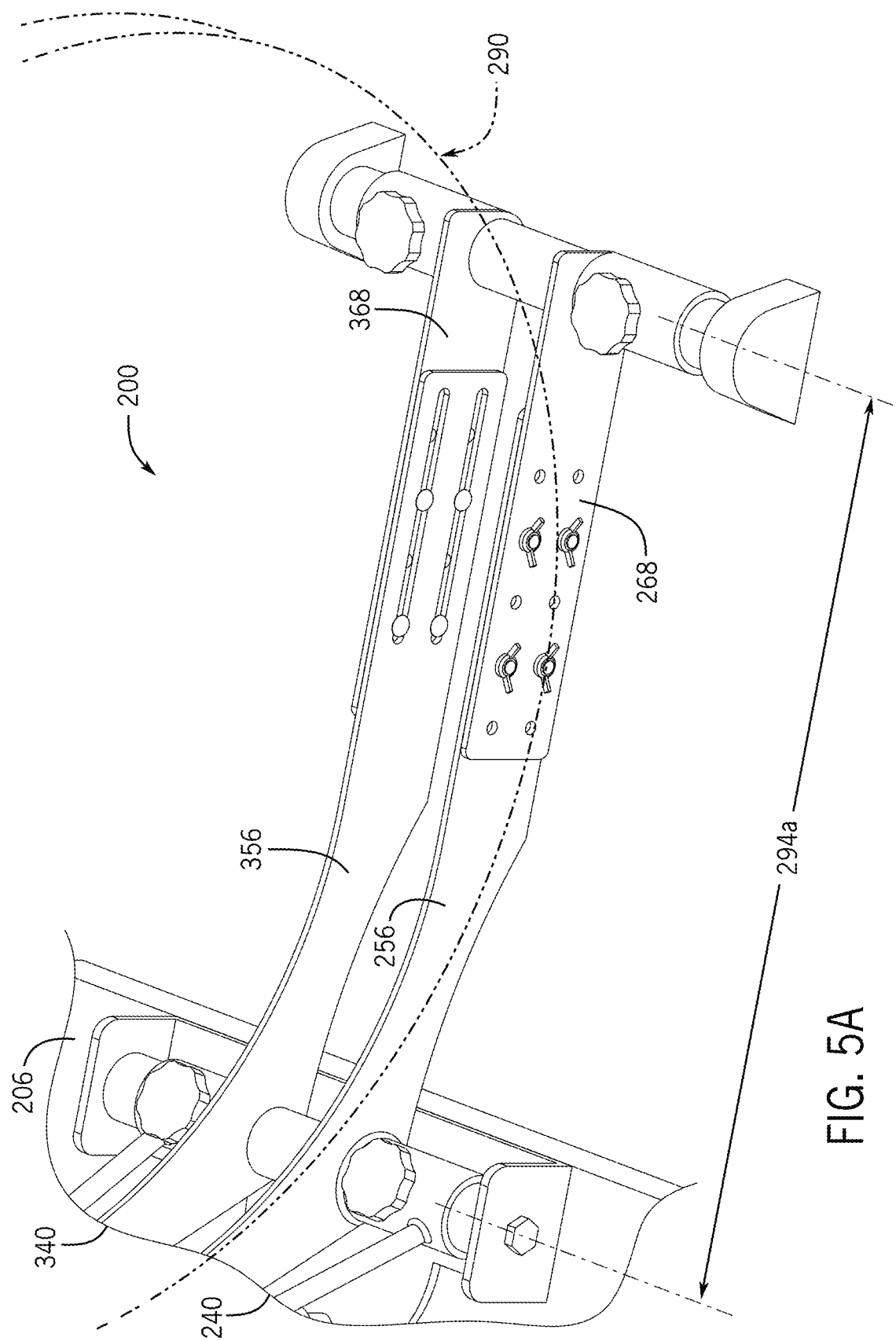
FIG. 5A depicts the bicycle rack having a first zone depth.

With reference to FIGS. 5A-5B, the bicycle rack 200 is shown being manipulated between a first zone depth and a second zone depth. As described herein, the first and second subassemblies 240, 340 can each be manipulated between an extended and a retracted state to define first and second lateral side lengths 280, 380, respectively. In this manner, the tire receiving zone 290 can be correspondingly manipulated to accommodate different sized tires. In this regard, FIG. 5A shows the tire receiving zone 290 at a first zone depth 294a. The first zone depth 294a can correspond to a substantially smaller-diameter tire, such as that of a child-sized bicycle, as one example. The first and second subassemblies 240, 340 can be moved relative to one another in order to define a second zone depth 294b, as shown in FIG. 5B. The second zone depth 294b can correspond to a substantially larger-diameter tire, such as that of an adult-sized bicycle. It will be appreciated, however, that the second zone depth 294b can correspond to a variety of values, and may be adjustable in order to meet bicycle and storage area requirements.

Figure 6:
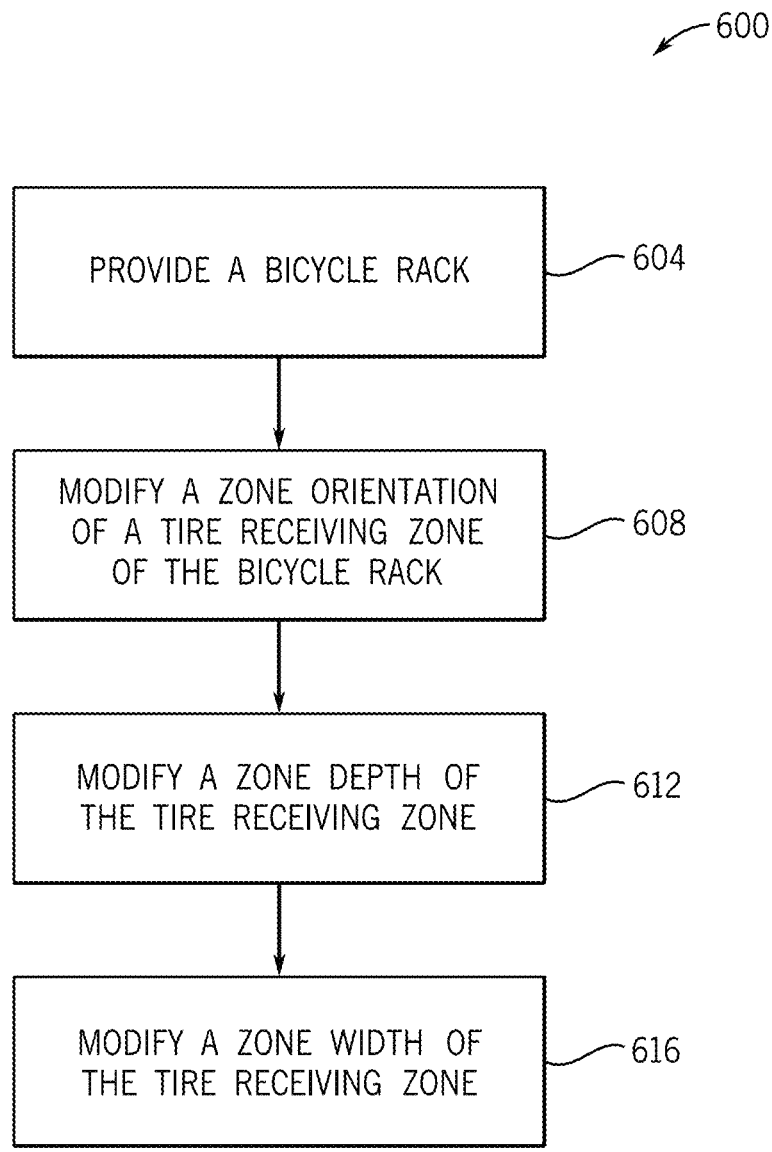
FIG. 6 depicts a flow diagram for organizing a storage area using a bicycle rack.

To facilitate the reader's understanding of the various functionalities of the embodiments discussed herein, reference is now made to the flow diagram in FIG. 6, which illustrates process 600. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 6, process 600 relates generally to a method for organizing a storage area using a bicycle rack. The process 600 may be used with any of the bicycle racks and assemblies described herein, for example, such as the bicycle racks, 114a-114d, 200, and variations and combinations thereof.

At operation 604, a bicycle rack is provided. For example and with reference to FIG. 2A, a bicycle rack 200 can be provided. As described herein, the bicycle rack 200 can include the mounting portion 214, the mechanical coupling 282, the first subassembly 240, the second subassembly 340, and associated components and features. The bicycle rack 200 includes the tire receiving zone 290 that is adapted to receive and hold a bicycle tire. As described herein, the tire receiving zone 290 can be manipulated in order to accommodate a variety of sizes of bicycle tires, such as tires having larger or smaller width and lengths. The tire receiving zone 290 can also be manipulated to orientate a bicycle for space-efficient storage in a storage space.

At operation 608, a mounting portion of the bicycle rack is rotated relative to the base. This rotation modifies a zone orientation of a tire receiving zone from a first orientation to a second orientation. For example and with reference to FIGS. 3A and 3B, the mounting portion 214 can be rotated relative to the base 204 to define an angular position of the tire receiving zone 290. In this regard, the tire receiving zone 290 can have the first angular orientation 296a shown in FIG. 3A. The mounting portion 214 can be subsequently rotated so that the tire receiving zone 290 has the second angular orientation 296b shown in FIG. 3B. The second angular orientation 296b can correspond with a space-efficient orientation of a bicycle within the storage area.

At operation 612, each of a first and a second subassemblies of the bicycle rack are manipulated. This manipulation modifies the zone depth from a first zone depth to a second zone depth. For example and with reference to FIGS. 5A and 5B, the first and second subassemblies 240, 340 can each be manipulated between a retracted and an extended configuration to define a depth of the tire receiving zone 290. In this regard, the tire receiving zone 290 can have the first zone depth 294a shown in FIG. 5A. The first and second subassemblies 240, 340 can each be manipulated so that the tire receiving zone 290 has the second zone depth 294b shown in FIG. 5B. The second zone depth 294b can be a modified zone depth that corresponds to a depth of a larger (or in certain embodiments a smaller) tire so that the bicycle rack 200 can accommodate bicycles tires of different sizes.

At operation 616, the first and second subassemblies of the bicycle rack are moved along the track. This movement modifies the zone width from a first offset between the first and second subassemblies to a second offset between the first and second subassemblies. For example and with reference to FIGS. 4A and 4B, the first and second subassemblies 240, 340 can be moved relative to one another to define a width of the tire receiving zone 290. In this regard, the tire receiving zone 290 can have the first zone width 292a shown in FIG. 4A. The first and second subassemblies 240, 340 can be moved relative to one another so that the tire receiving zone 290 has the second zone width 292b shown in FIG. 4B. The second zone width 292b can be a modified zone width that corresponds to a width of a larger (or in certain embodiments a smaller) tire so that the bicycle rack 200 can accommodate bicycles tires of different sizes.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A bicycle rack for organizing a storage area, comprising: a base;
   a mounting portion rotatably coupled to the base and including a track; a first subassembly moveably coupled with the track and defining a first lateral side with a first lateral side length, the first subassembly manipulateable between a first extended state and a first retracted state to modify the first lateral side length;
   a second subassembly movably coupled with the track and defining a second lateral side with a second lateral side length, the second subassembly manipulateable between a second extended state and a second retracted state to modify the second lateral side length, wherein the second lateral side faces the first lateral side, and wherein the first and second lateral sides are offset from one another; and
   a mechanical coupling moveably coupled with the first and second subassemblies opposite the track, wherein:
   the track, the first subassembly, the second subassembly, and the mechanical coupling cooperate to define a tire receiving zone that is adapted to hold and store a tire of a bicycle,
   the tire receiving zone has:
   a zone width defined by the offset and being adjustable in response to movement of the first and second subassemblies along the track,
   a zone depth defined by the first and second lateral side lengths and being adjustable in response to manipulation of each of the first and second subassemblies, and
   a zone orientation defined by an angular position of the mounting portion and adjustable in response to a rotation of the mounting portion relative to the base.

2. The bicycle rack of claim 1, wherein:
   the mounting portion comprises a rotational locking mechanism; and
   the rotational locking mechanism is adapted to rotationally secure the mounting portion at the angular position.

3. The bicycle rack of claim 2, wherein:
   the angular position is a first angular position;
   the mounting portion is rotatable into a second angular position relative to the base that is different from the first angular position; and
   the rotational locking mechanism is adapted to angularly secure the mounting portion in the second angular position.

4. The bicycle rack of claim 2, wherein the rotational locking mechanism includes a resiliently biased protrusion, the resiliently biased protrusion selectively receivable by the base.

5. The bicycle rack of claim 1, wherein:
   the mounting portion further comprises a holder supported by the base; and
   the track is held by the holder above the base and defines a path of travel for the first and second subassemblies above and along the base.

6. The bicycle rack of claim 1, wherein the first and second subassemblies are slideably coupled on the track.

7. The bicycle rack of claim 1, further comprising a track locking mechanism associated with one or both of the first and second subassemblies and adapted to secure the first or second subassemblies at a position along the track to define the offset.

8. The bicycle rack of claim 7, wherein
   the offset is a first offset;
   the first and second subassemblies are moveable along the track to define a second offset that is different from the first offset; and
   the track locking mechanism is adapted to secure the first and second subassemblies along the track at the second offset.

9. The bicycle rack of claim 1, wherein:
   the first subassembly comprises:
   a first portion engaged with the track; and
   a second portion engaged with the mechanical coupling;
   the first and second portions of the first subassembly are associated with one another and manipulateable relative thereto to adjust the first lateral side length.

10. The bicycle rack of claim 9, wherein:
    the first and second portions cooperate to define the first lateral side length; and
    the first and second portions are moveable relative to one another to define:
    the first extended state in which the first lateral side length is a first value; and
    the first retracted state in which the first lateral side length is a second value that is different from the first value.

11. The bicycle rack of claim 10, wherein the first subassembly further comprises a fastener configured to selectively secure the first and second portions to one another in the first extended state or the second extended state.

12. The bicycle rack of claim 11, wherein:
    one of the first or second subassemblies includes a slot;

another of the first or second subassemblies includes a series of through portions; and the fastener is receivable through the slot and one of the series of through portions to define the first lateral side length and prevent relative movement of the first and second portions of the first subassembly.

13. The bicycle rack of claim 9, wherein the first portion defines an arcuate portion defining a zone height of the tire receiving zone.

14. The bicycle rack of claim 13, wherein the first portion further comprises:
   a cart structure connected with the arcuate portion and configured to receive a portion of the track; and
   an angular brace extending between the cart structure and the arcuate portion and enhancing a rigidity of an uppermost end of the arcuate portion.

15. A system for organizing a storage area, comprising:
   a first bicycle rack, which is the bicycle rack of claim 1; and
   a second bicycle rack adapted to secure a bicycle and having a second tire receiving zone with an adaptable second zone orientation, an adaptable second zone width, and an adaptable second zone depth.

16. The system of claim 15, wherein the first and second bicycle racks are modular components selectively couplable to and decoupleable with one another.

17. The system of claim 15, wherein the second zone orientation of the second tire receiving zone of the bicycle rack is substantially parallel with the zone orientation of the tire receiving zone of the first bicycle rack.

18. The system of claim 17, wherein:
   the first and second bicycle racks are arranged adjacent one another and arranged along an assembly direction; and
   the second zone orientation of the second tire receiving zone and the zone orientation of the tire receiving zone of the first bicycle rack are each substantially 45 degrees from the assembly direction.

19. The system of claim 15, wherein:
   the system further comprises an alignment structure; and
   each of the first and second bicycle racks are connected to the alignment structure, in series.

20. A method for organizing a storage area using a bicycle rack, the method comprising:
   providing the bicycle rack of claim 1;
   rotating the mounting portion relative to the base, thereby modifying the zone orientation of the tire receiving zone from a first zone orientation to a second zone orientation;
   manipulating each of the first and second subassemblies, thereby modifying the zone depth from a first depth to a second depth; and
   moving the first and second subassemblies along the track, thereby modifying the zone width from a first offset between the first and second subassemblies to a second offset between the first and second subassemblies.

* * * * *